United States Patent
Wada

[11] Patent Number: 5,463,292
[45] Date of Patent: Oct. 31, 1995

[54] IMAGING APPARATUS HAVING ROTARY TABLE

[75] Inventor: Jyoji Wada, Yokohama, Japan

[73] Assignee: Matsushita Electric Industrial Co., Ltd., Osaka, Japan

[21] Appl. No.: 216,347

[22] Filed: Mar. 23, 1994

[30] Foreign Application Priority Data

Mar. 25, 1993 [JP] Japan .................................. 5-066314

[51] Int. Cl.$^6$ ..................................................... H02P 1/54
[52] U.S. Cl. ........................... 318/34; 318/560; 318/615; 318/35; 318/577
[58] Field of Search ..................................... 318/560, 615, 318/34, 35, 577

[56] References Cited

U.S. PATENT DOCUMENTS 3,612,206  10/1971  Ohntrup .................................. 318/560
4,135,217  1/1979  Jacques et al. ......................... 318/617

FOREIGN PATENT DOCUMENTS 63-31884A  12/1988  Japan.
1288069A  11/1989  Japan.

Primary Examiner—William M. Shoop, Jr.
Assistant Examiner—Karen Masih
Attorney, Agent, or Firm—Stevens, Davis, Miller & Mosher

[57] ABSTRACT

In an imaging apparatus with rotary table having a plurality of control items, operation completion of control items, such as horizontal angle, vertical angle, zoom and focus, of the imaging apparatus and the rotary table is detected by respective completion detectors and so on. On the basis of the logical product of all operation completion signals, an AND circuit 3 permits control toward the next desired value.

18 Claims, 9 Drawing Sheets

F I G. 4
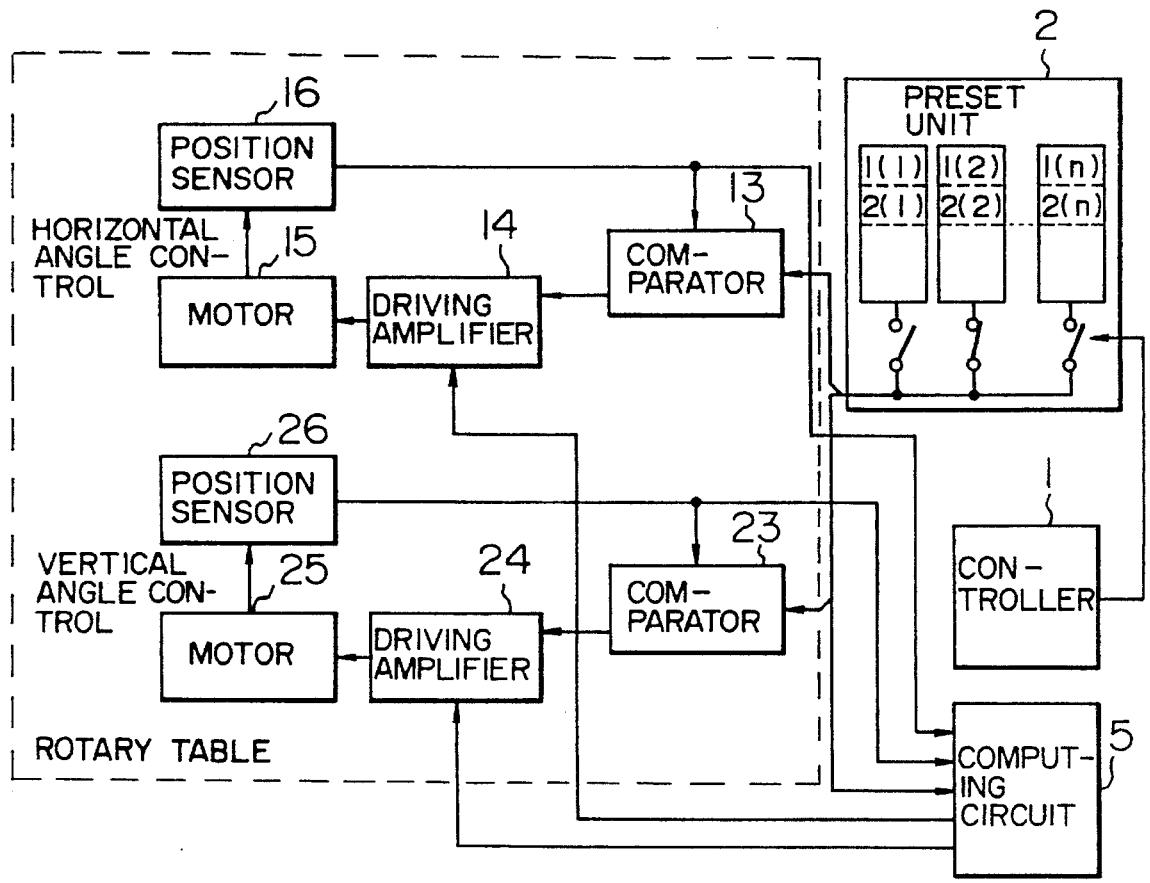
F I G. 5
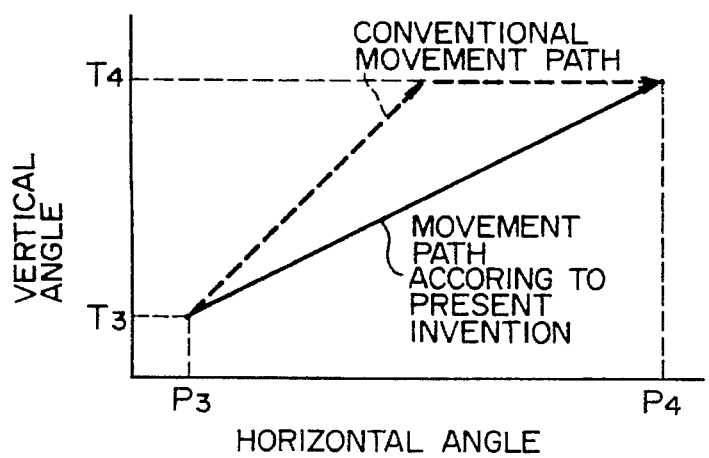

IMAGING APPARATUS HAVING ROTARY TABLE

BACKGROUND OF THE INVENTION

The present invention relates to an imaging apparatus having a rotary table to be used for monitoring and recording.

FIG. 9 is a block diagram showing the configuration of a conventional imaging apparatus. With reference to FIG. 9, n combinations of desired position data with respect to control items of four kinds 1(n) to 4(n) are stored in a preset unit 2. One arbitrary combination is selected according to an input supplied from a controller 41. A comparator 13 is supplied with selected desired position data of 1(n), such as 1(2). Its output is inputted to a horizontal-angle control motor 15 via a driving amplifier 14. Turning force of the motor 15 drives horizontal rotation of a rotary table via a reduction gear or the like. The horizontal angle of the rotary table is detected by a position sensor 16 and inputted to the comparator 13. A comparator 23 is supplied with desired position data, such as 2(2), of the preset unit 2. A vertical-angle control motor 25 drives vertical rotation of the rotary table. In addition, a series of operations of a driving amplifier 24, the motor 25, and a position sensor 26 are the same as those of the driving amplifier 14, the motor 15, and the position sensor 16. In completely the same way, numerals 33 and 43 denote comparators. The comparators 33 and 43 are supplied with desired position data 3(2) and 4(2), respectively. Numerals 34 and 44 denote driving amplifiers, and numerals 35 and 45 denote zoom-control motor and focus-control motor. The driving amplifier 34 and the motor 35 drive the zoom, whereas the driving amplifier 35 and the motor 45 drive the focus. Numerals 36 and 46 denote position sensors.

Operation of the conventional imaging apparatus having the above described configuration will now be described. Among one set of data selected by a movement instruction, desired position data of horizontal angle 1(2), desired position data of vertical angle 2(2), desired position data of zoom 3(2), and desired position data of focus 4(2) are inputted to the comparators 13, 23, 33 and 43, respectively. In the comparator 13, the desired position data 1(2) supplied from the preset unit 2 is compared with the output of the position sensor 16. An output proportionate to the difference between them is-amplified by the driving amplifier 14. The amplified output is supplied to the motor 15. The angle of the rotary table rotated horizontally by the rotation output of the motor 15 is converted into an electric signal by the position sensor 16. The electric signal is fed back to the comparator 13. If the horizontal angle has reached the desired position data value, the motor 15 is stopped. Operations of control items of three other kinds are also conducted in the same way.

In this way, the conventional imaging apparatus can move to respective desired values of various control items set beforehand and take a desired image according to a command given from the controller.

(1) In the above described conventional imaging apparatus, however, respective movement operations are conducted independently. Time values required for operations of respective control items depend upon initial values and desired values of positions and hence they are divergent. Thus the time required for a camera to yield a desired image is indefinite. Whether the movement has been completed and the desired image is ready to be displayed or not cannot be sensed by the controller 41. Therefore, the conventional imaging apparatus has a problem (a first subject) that the next movement may be started in response to the next movement instruction issued by the controller 41 although the preceding movement has not been completed and the desired image is not obtained.

(2) Furthermore, in the above described conventional imaging apparatus, respective movement operations are conducted independently. Therefore, if a desired visual field has already been obtained before all control items arrive at desired values, it is wasteful to wait for the succeeding movement time, resulting in a second subject.

(3) Furthermore, in the above described conventional imaging apparatus, time lengths required for movement from initial positions respectively of the horizontal angle and vertical angle of the rotary table to next desired positions are not equal, in general, between the horizontal rotation and vertical rotation. In case the vertical rotation, for example, is completed earlier, the imaging apparatus goes straight ahead obliquely in the direction of composition of the horizontal speed and the vertical speed during the vertical rotation whereas the imaging apparatus goes straight ahead in the horizontal direction after the vertical rotation has been completed. Therefore, the movement direction of the screen is bent. This results in a third subject that the observer feels a malaise.

(4) Furthermore, in the above described conventional imaging apparatus, a plurality of sets of preset position data are executed to conduct movements in the order of preset number with respect to control items such as the horizontal angle and vertical angle of the rotary table. Therefore, direction of movement is random and many reciprocating movements are conducted in vain. This results in a fourth subject that the period of making one round among preset position data is long.

(5) Furthermore, in the above described conventional imaging apparatus, subjects to be monitored during the daytime are different from subjects to be monitored during the night. This results in a fifth subject that desired position data preset for control must be changed over between daytime and night by means of a switch.

SUMMARY OF THE INVENTION

In order to solve the first subject, the present invention provides an excellent imaging apparatus with rotary table capable of sensing completion of movement by using a controller.

In order to solve the second subject, the present invention provides an excellent imaging apparatus with rotary table capable of sensing completion of movement or acquirement of a desired visual field by using a controller.

In order to solve the third subject, the present invention provides an excellent imaging apparatus with rotary table requiring the same time for both horizontal rotation and vertical rotation and hence moving on a straight line extending from an initial position to a desired position.

In order to solve the fourth subject, the present invention provides an excellent imaging apparatus with rotary table calculating to derive such an execution sequence as to allow making one round among preset position data in the shortest time and executing movements according to the derived execution sequence.

In order to solve the fifth subject, the present invention provides an excellent imaging apparatus with rotary table which automatically discriminates between data for daytime and data for night on the basis of preset control data and which does not need changeover using a switch.

(1) Means for solving the first subject in the imaging apparatus of the present invention includes control means for selecting one set out of a plurality of sets of desired position data preset for control and for causing operation, power sources provided for respective control items to cause movement toward desired positions, position sensors provided for respective control items to generate current position information, completion detectors provided for respective control items to detect movement completion, and an AND circuit for performing an AND function on outputs of all completion detectors.

(2) Means for solving the second subject in the imaging apparatus of the present invention includes control means for selecting one set out of a plurality of sets of desired position data preset for control and for causing operation, power sources provided for respective control items to cause movement toward desired positions, position sensors provided for respective control items to generate current position information, completion detectors provided for respective control items to detect movement completion, and computing means for calculating a range of visual field of the imaging apparatus on the basis of outputs of all completion detectors and outputs of all position sensors.

(3) Means for solving the third subject in the imaging apparatus of the present invention includes control means for selecting one set out of a plurality of sets of desired position data preset for control and for causing operation, with respect to control items of a horizontal angle and a vertical angle, driving means provided for respective control items to drive power sources, power sources provided for respective control items to cause movement toward desired positions, position sensors provided for respective control items to generate current position information, and computing means for calculating time values respectively required for horizontal movement and vertical movement on the basis of desired position data of respective control items and outputs of position sensors of respective control items, and for deriving such control outputs as to make shorter one of required time values equal to the other.

(4) Means for solving the fourth subject in the imaging apparatus of the present invention includes control means for selecting such an execution sequence as to minimize a period of one round out of all combinations of execution sequences for a plurality of sets of desired position data preset for control by means of calculation, the control means storing the selected execution sequence and ordering execution in the execution sequence.

(5) Means for solving the fifth subject in the imaging apparatus of the present invention includes provision of a function of discriminating control data by using specific data preset in addition to a control item or specific data included in data of the control item.

(1) By the means for solving the first subject, movements toward desired positions are conducted with respect to respective control items after desired control values are given, and signals are yielded from the completion detectors. When all movements have been completed, the control means can receive an operation completion signal by the operation of the AND circuit. It is thus possible to realize an excellent imaging apparatus with rotary table which move toward desired positions after desired control values are given and which outputs an operation completion signal when all movement have been completed.

(2) By the means for solving the second subject, the computing means calculates a desired visual field and a current visual field on the basis of desired control values and outputs of the position sensors, and compares the desired visual field with the current visual field. Even if movements to desired positions are not completed with respect to respective control items after desired control values have been given, the control means can receive an operation completion signal when the desired visual field has been obtained in the imaging apparatus, resulting in time saving. It is thus possible to realize an excellent imaging apparatus with rotary table which outputs an operation completion signal when the desired visual field has been obtained even if the desired control position is not reached.

(3) By the means for solving the third subject, the computing means calculates time values required for movements respectively of horizontal angle and vertical angle on the basis of desired position data and current position information, and compares them. The computing means controls the driving means so as to prolong shorter one of required time values and make it equal to longer one. Since movements of horizontal angle and vertical angle are thereby completed at the same time, the imaging apparatus moves on a straight line. Thus, image movement does not provide feeling of a malaise. It is thus possible to realize an excellent imaging apparatus with rotary table in which the horizontal angle and horizontal angle simultaneously arrive at desired control positions.

(4) By the means for solving the fourth subject, the control means calculates the period of one round of execution for all combinations of sequences of as many desired control position data as been preset, compares them with each other, derives and stores a combination having the shortest period, and orders execution in that sequence. By only presetting various position data needing images, therefore, movements are executed in such a sequence that one round of them can be conducted automatically in the shortest time. That is to say, it is possible to realize an excellent imaging apparatus with rotary table which can move to conduct one round among preset subjects in a short time.

(5) By the means for solving the fifth subject, the control means can extract, discriminate and control a specific item out of preset data. Therefore, it is possible to realize an excellent imaging apparatus with rotary table which can automatically select a data group.

BRIEF DESCRIPTION OF THE DRAWINGS

FIG. 4 is a block diagram showing the configuration in a third embodiment of the present invention;

FIG. 5 is a diagram illustrating the operation of the third embodiment of the present invention;

DESCRIPTION OF THE PREFERRED EMBODIMENTS (Embodiment 1)

Figure 1:
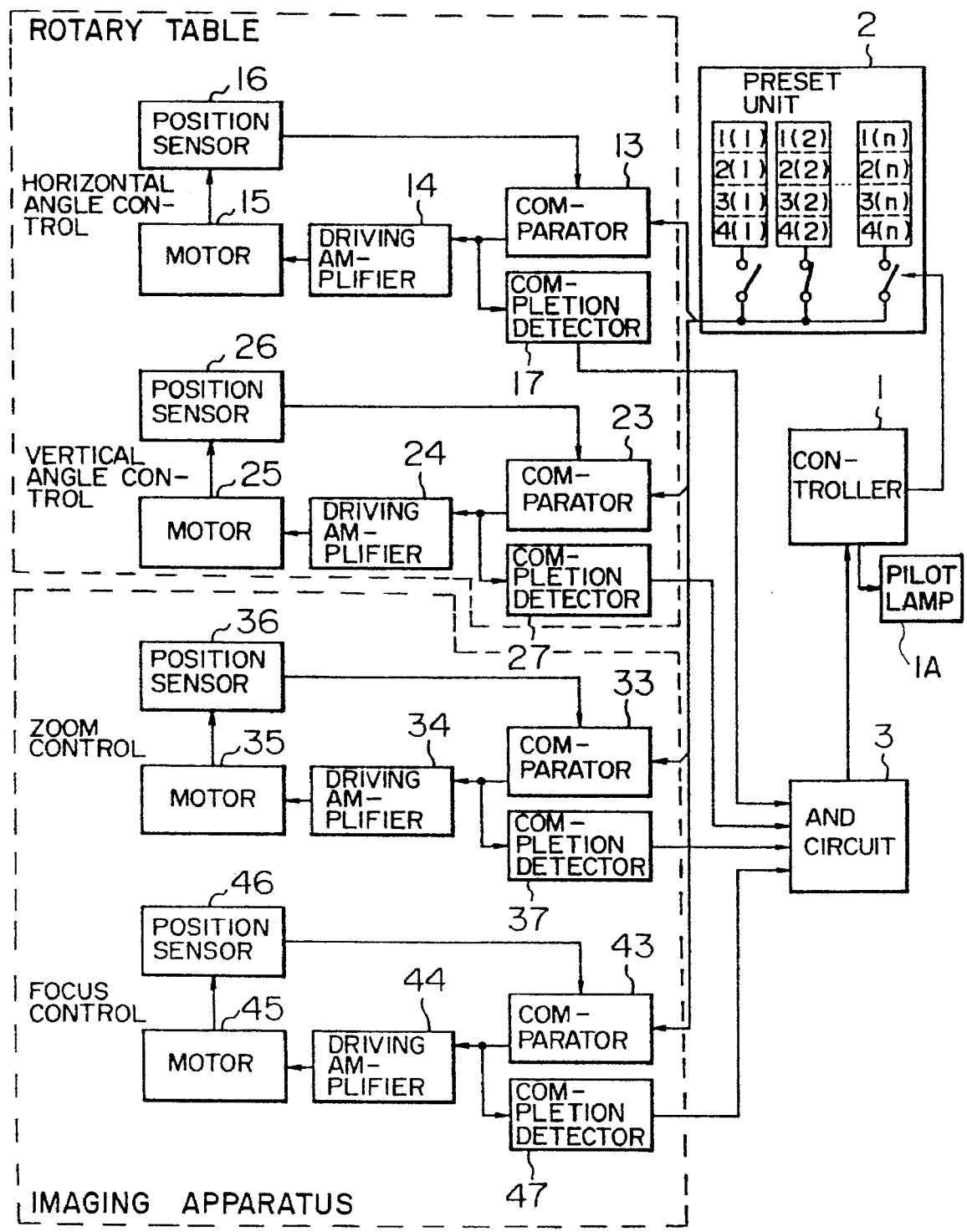
FIG. 1 is a block diagram showing the configuration in a first embodiment of the present invention.
Figure 9:
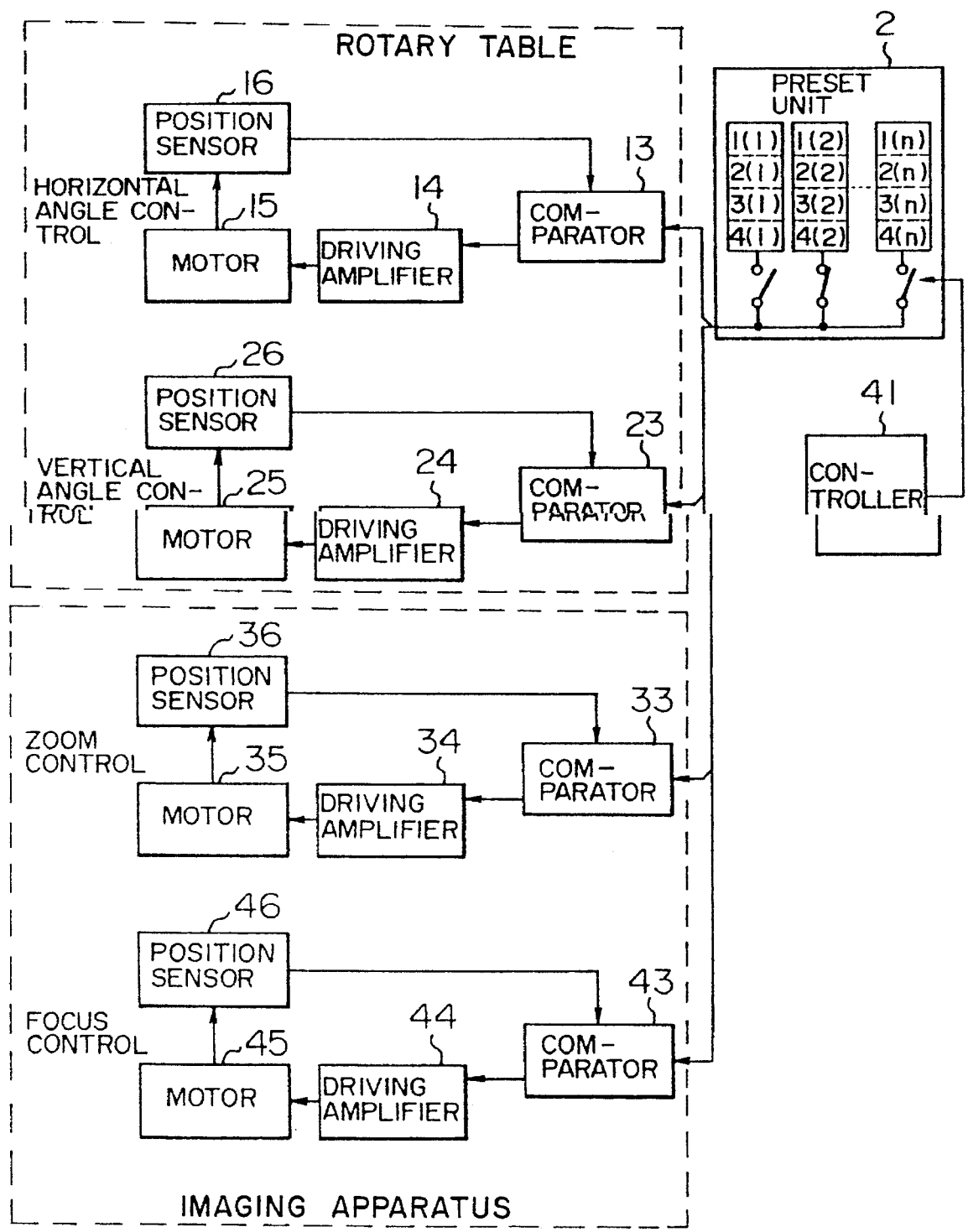
FIG. 9 is a block diagram showing the configuration according to the prior art.
Figure 10:
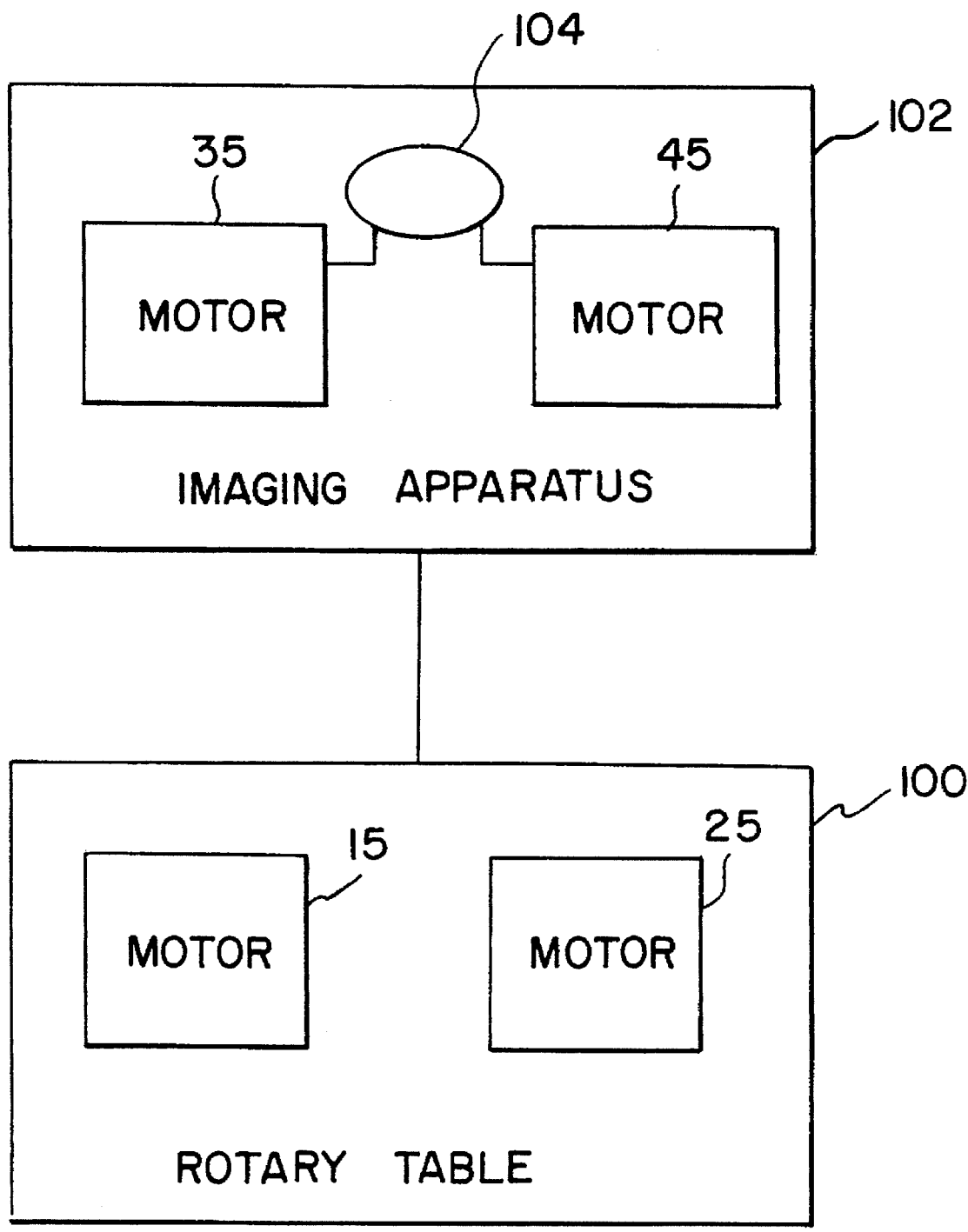
FIG. 10 is a block diagram showing an overview of the present invention.

FIG. 1 is a block diagram showing the schematic configuration of a first embodiment of the present invention. In FIG. 1, components having the same numerals as those of FIG. 9 have like names and functions and will not be further described. Numeral 1 denotes a controller, whose output is inputted to a preset unit 2. Numeral 3 denotes an AND circuit, whose output is inputted to the controller 1. Numerals 17, 27, 37 and 47 denote completion detectors supplied with outputs of comparators 13, 23, 33 and 43, respectively. All outputs of the completion detectors 17, 27, 37 and 47 are inputted to the AND circuit 3. As seen in FIG. 10, motors 15 and 25 supply motive power to rotary table 100, while motors 35 and 45 supply motive power to lens 104 in imaging apparatus 102.

Operation of the imaging apparatus configured as heretofore described will now be described by referring to FIG. 1. First of all, the controller 1 issues a movement instruction. Thereby, one specified set, such as (2) for example, is selected out of n sets of desired position data preset in the preset unit 2. Desired position data 1(2), 2(2), 3(2) and 4(2) are thus inputted to the comparators 13, 23, 33 and 43. Data 1(2), 2(2), 3(2) and 4(2) are desired position data of horizontal angle, vertical angle, zoom and focus, respectively. In the comparator 13, the desired position data 1(2) supplied from the preset unit 2 is compared with the output of the position sensor 16. The output of the comparator 13 proportionate to the difference between them is amplified by the driving amplifier 14. The difference thus amplified is supplied to the horizontal-angle control motor 15. The horizontal angle of the rotary table rotated horizontally by the rotation output of the motor 15 is converted to an electric signal by the position sensor 16. The electric signal is fed back to the comparator 13. If the horizontal angle reaches the desired value, the motor 15 is stopped. At this time, the output of the comparator 13 has a value of 0. Therefore, the completion detector 17 detects this and inputs the detected output to the AND circuit 3. Operations of control items of three other kinds are conducted in the same way. Only when all of detection outputs from the comparators 13, 23, 33 and 43 are supplied to the AND circuit 3, it sends its output to the controller 1. Recognizing that movements for all control items have been completed, the controller 1 may indicate that fact by using a pilot lamp 1A. Or after a required imaging time has elapsed, the controller may automatically proceed to the next movement instruction.

(Embodiment 2)

Figure 2:
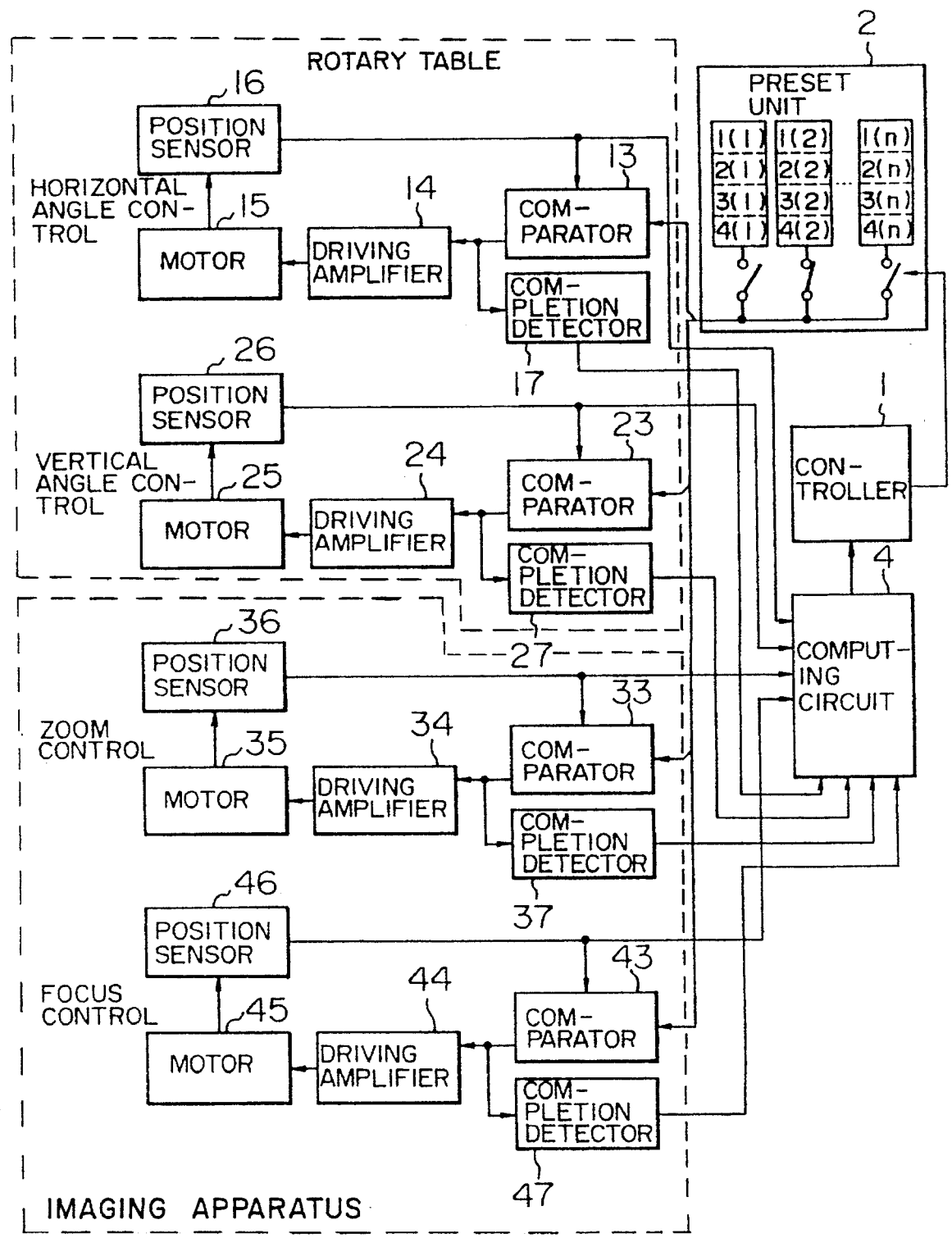
FIG. 2 is a block diagram showing the configuration in a second embodiment of the present invention.
Figure 3A:
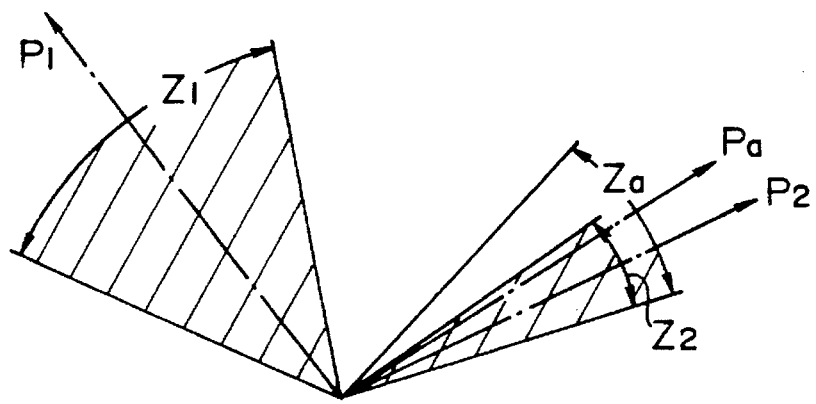
FIG. 3A is a diagram illustrating the operation of the second embodiment.
Figure 3B:
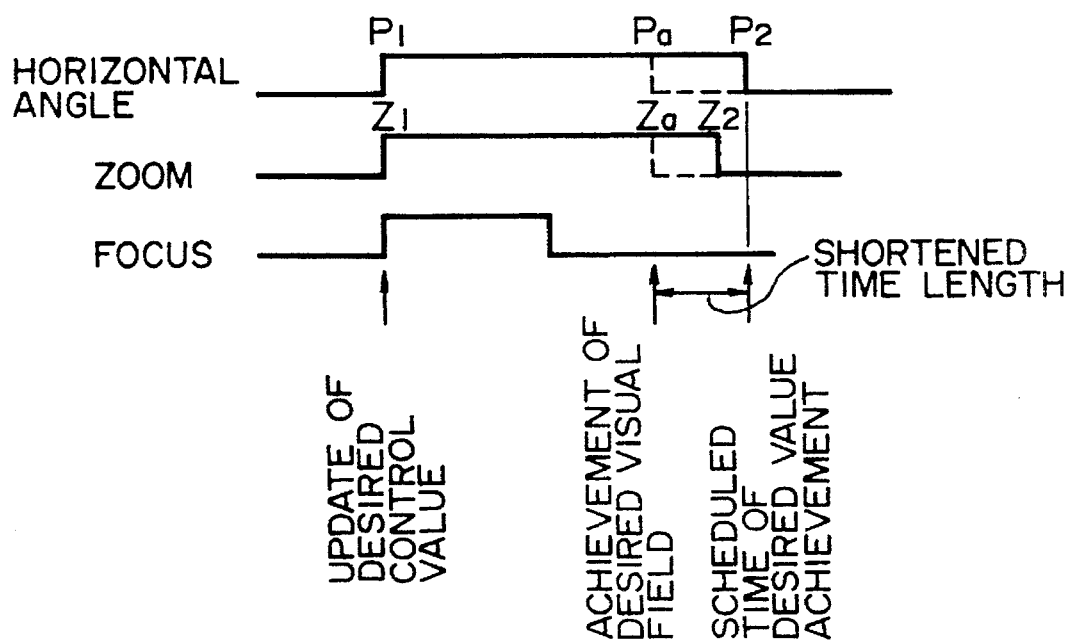
FIG. 3B is a time chart of the second embodiment.

FIG. 2 is a block diagram showing the schematic configuration of a second embodiment of the present invention. FIG. 3A is a diagram illustrating the operation of the second embodiment. FIG. 3B is a time chart of the second embodiment. In FIG. 2, components having the same numerals as those of FIG. 1 have like names and functions and will not be further described. Numeral 4 denotes a computing circuit. The computing circuit 4 is supplied with outputs of the position sensors 16, 26, 36 and 46 and outputs of the completion detectors 17, 27, 37 and 47. The output of the computing circuit 4 is supplied to the controller 1.

Operation of the second embodiment configured as described above will now be described as to difference from the operation of the first embodiment. On the basis not only of the AND function of inputs fed from the completion detectors 17, 27, 37 and 47 but also of inputs fed from the position sensors 16, 26, 36 and 46, the computing circuit 4 calculates the range of visual field of a camera. When the desired range of visual field indicated by the desired position data has been obtained, the computing circuit 4 regards it as completion of movement and sends a completion signal to the controller 1. In FIG. 3A, P1 denotes an initial value of the horizontal angle, and Z1 denotes an initial value of the horizontal angle of field of zoom. P2 denotes a desired value of horizontal angle, and Z2 denotes a desired value of the horizontal angle of field of zoom. From the initial values P1 and Z1, horizontal rotation and zoom move toward the new desired values P2 and Z2. If it is now assumed that a horizontal angle Pa and a horizontal angle of field Za are reached at an intermediate time point, the desired screen Z2 is completely included in the range of angle of field Pa already at this time point. Therefore, the computing circuit 4 is adapted to issue an-operation completion signal to the controller 1 at this time point. Viewing this on a time chart, the horizontal angle, vertical angle, zoom and focus simultaneously begin to move the moment desired values for control are updated as shown in FIG. 3B. First of all, the focus reaches its desired position. Subsequently, the zoom is scheduled to reach its desired value at the time point denoted by Z2. Finally, the horizontal angle is scheduled to reach its desired value at the time point denoted by P2. However, the desired visual field is obtained at a preceding time point denoted by Pa and Za. Therefore, time length can be shortened by the difference between the time point Pa and the time point P2.

(Embodiment 3)

FIG. 4 is a block diagram showing the schematic configuration of a third embodiment of the present invention. FIG. 5 is a diagram illustrating the operation of the third embodiment. In FIG. 4, components having the same numerals as those of FIG. 1 have like names and functions and will not be further described. Numeral 5 denotes a computing circuit. The computing circuit 5 is supplied with outputs of the position sensors 16 and 26 and output of the preset unit 2. The output of the computing circuit 5 is supplied to the driving amplifiers 14 and 24.

Operation of the third embodiment configured as described above will now be described as to difference from the operation of the first embodiment. On the basis of a desired position data group selected in the preset unit 2 by the controller 1, such as 1(2) and 2(2), and current position information pieces outputted by the position sensors 16 and 26, the computing circuit 5 calculates time values required for movement respectively in horizontal angle and vertical angle. FIG. 5 is a graph showing the horizontal angle and vertical angle. With reference to FIG. 5, it is now assumed that current horizontal and vertical positions are respectively P3 and T3 whereas desired horizontal and vertical positions are respectively P4 and T4. Assuming that horizontal movement speed and vertical movement speed are Vp and VT, respectively, horizontal and vertical movement time are given by the following equations.

Horizontal movement time=(P4 - P3)/Vp

Vertical movement time=(T4 - T3)/VT

During an interval from the point of coordinates (P3, T3) until the vertical movement is completed, the conventional rotary table moves in a direction of a composite vector of the horizontal movement speed and vertical movement speed as indicated by a broken line in FIG. 5. After the vertical movement has been completed upon reaching T4, the conventional rotary table moves in the horizontal direction until P4 is reached. Thus the conventional rotary table traces a bent path. In the third embodiment, the computing circuit 5 compares time values required for movements. If, for example, the time required for movement of vertical angle is shorter, a signal for controlling the driving amplifier 24 so as to make the vertical speed equal to the value of the following equation is outputted in order to make the vertical movement time equal to the horizontal movement time.

Vertical speed=Vp×(T4 - T3)/(P4 - P3)

If the time required for movement of horizontal angle is shorter, a signal for controlling the driving amplifier 14 so as to make the horizontal speed equal to the value of the following equation is outputted.

Horizontal speed=VT×(P4 - P3)/(T4 - T3)

Since the time required for horizontal movement thus becomes equal to the time required for vertical movement, the rotary table which has started from the point (P3, T3) can move on a straight line toward the point (P4, T4). Therefore, as there are no bends in the movement path, the image observer feels no malaise.

(Embodiment 4)

Figure 6A:
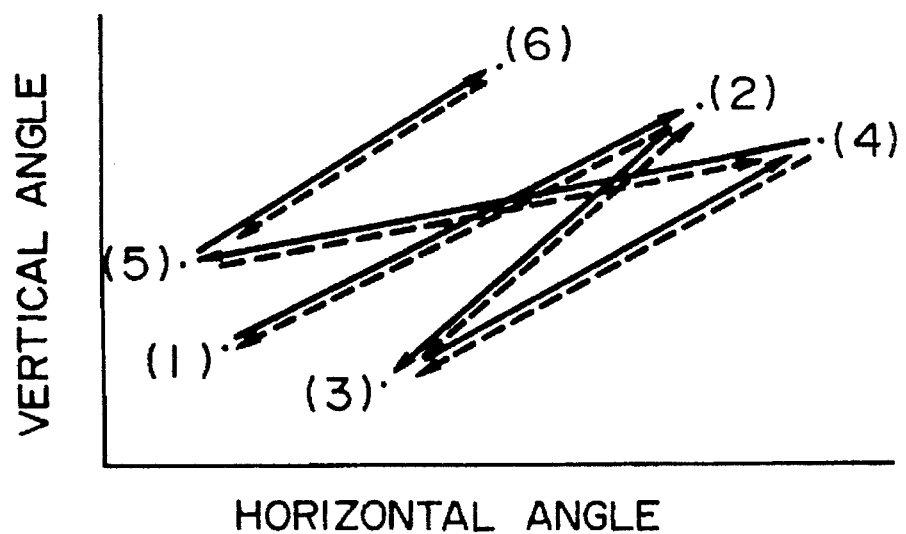
FIG. 6A is a diagram showing the presetting sequence of desired control position data in a fourth embodiment of the present invention.
Figure 6B:
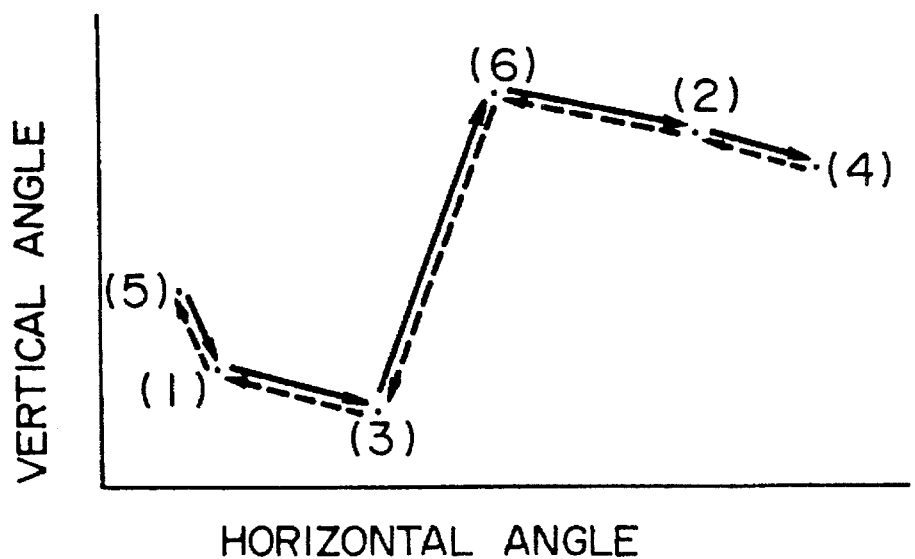
FIG. 6B is a diagram showing such a sequence as to minimize the period of one round of desired control position data in the fourth embodiment.
Figure 7:
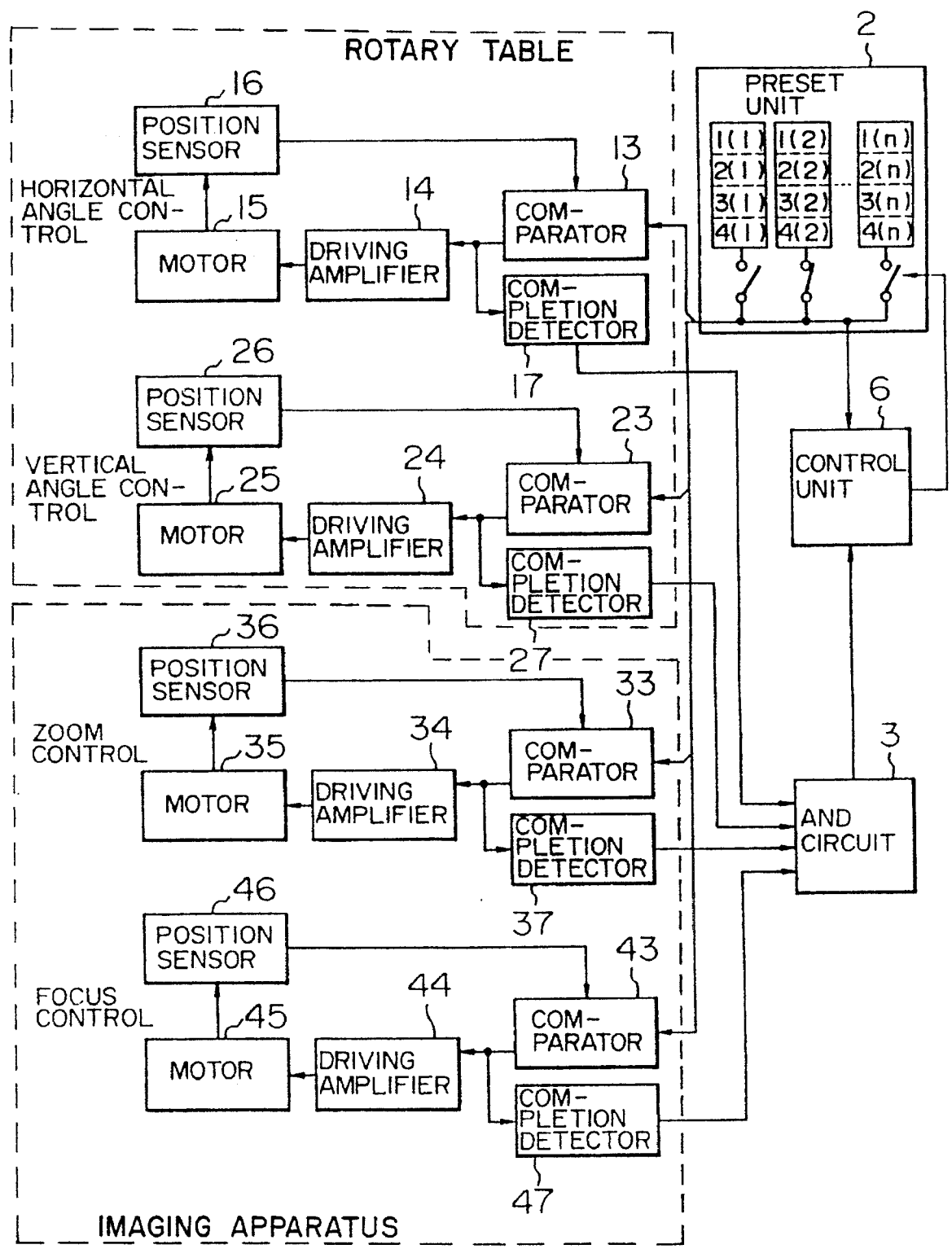
FIG. 7 is a block diagram showing the configuration in the fourth embodiment of the present invention.

FIGS. 6A and 6B are diagrams illustrating the operation of a fourth embodiment. FIG. 6A is a diagram showing the preset sequence of desired position data for control. FIG. 6B is a diagram showing a sequence minimizing the period of one round in the desired position data for control. FIG. 7 is a block diagram showing the configuration of the fourth embodiment.

In FIG. 7, components having the same numerals as those of FIG. 1 have like names and functions and will not be further described. A control unit 6 has a function including the function of the controller 1 of FIG. 1. From the viewpoint of connection, the control unit 6 differs from the controller 1 in that the output of the preset unit 2 is also inputted to the control unit 6.

In FIG. 6A, the abscissa indicates the horizontal angle of the rotary table, whereas the ordinate indicates the vertical angle. (1), (2), (3) and so on represent order of presetting position data. If the rotary table is activated in this sequence, the imaging apparatus first moves so as to look toward the direction of (1). Thereafter the imaging apparatus moves to the next direction position (2). Then the imaging apparatus moves to the direction position (3). Thus the imaging apparatus arrives at the final direction position such as (6). In FIG. 6A, this path is represented by solid line arrows. In repeating monitoring, there are a method of moving to (1) after (6) and another method of returning conversely as represented by (6)→(5)→(4). In FIG. 6A, the method of returning conversely is illustrated as an example, and the path is represented by broken line arrows. In general, the movement path according to the preset sequence includes many reciprocating paths and needs a long time to make one round. The number of permutations in arranging n desired position data preset for control is equal to n factorial. However, the number is reduced to half in case the same path is traced conversely. In the present embodiment, the control unit 6 is provided with function of calculating one-round periods for all of the permutations, comparing them with each other, selecting and storing such a sequence as to cause the shortest time, and executing movement according to the sequence. As shown in FIG. 6B, therefore, the imaging apparatus can move in the fastest path represented as (5)→(1)→(3)→(6)→(2)→(4).

By setting a control function, it is possible to adopt, for selecting the shortest period, completion of any data such as only horizontal angle, only vertical angle, both horizontal angle and vertical angle, or all data including zoom and the like.

(Embodiment 5)

Figure 8:
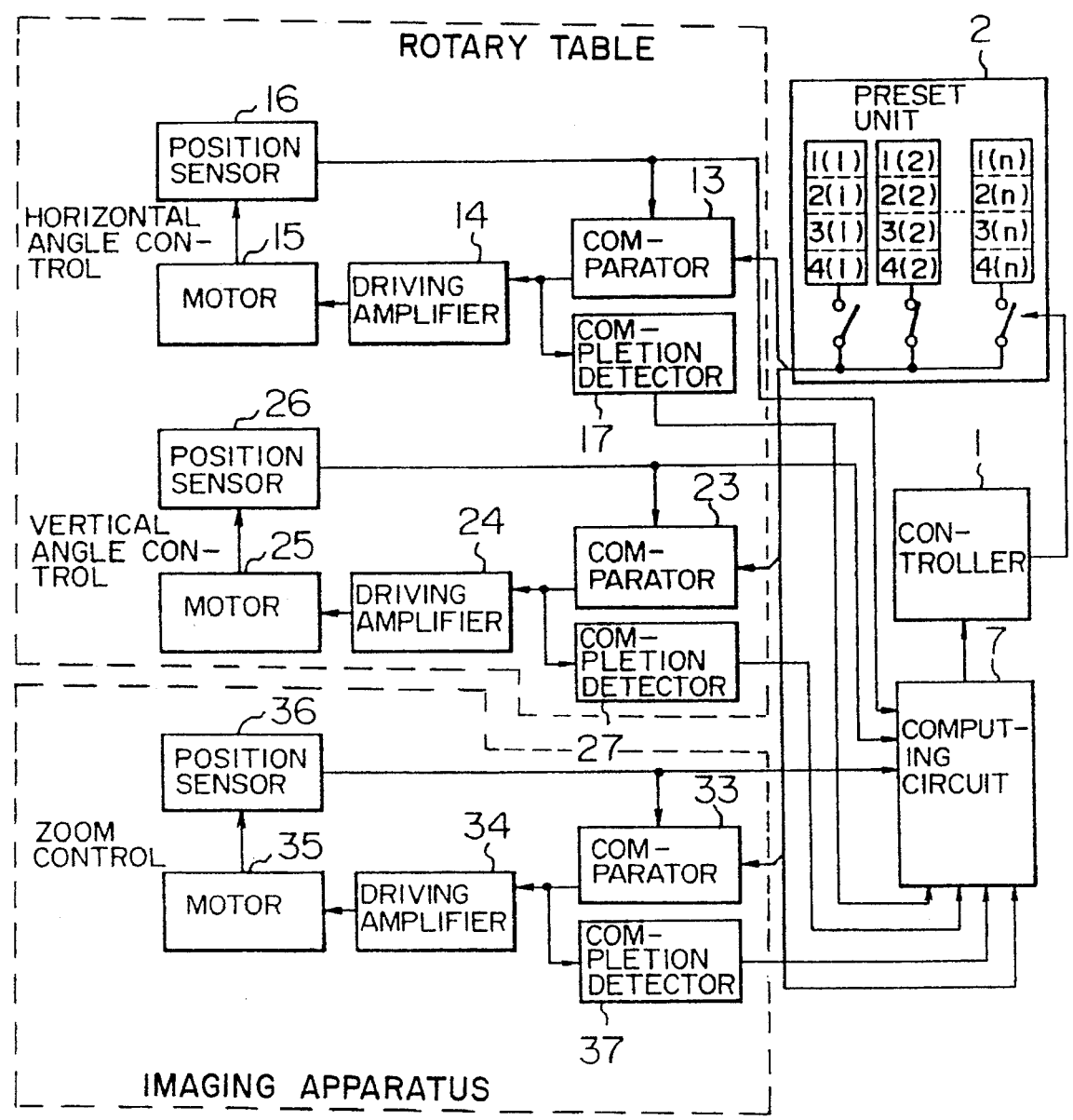
FIG. 8 is a block diagram showing the configuration in a fifth embodiment of the present invention.

FIG. 8 is a block diagram showing the configuration of the embodiment 5. In FIG. 8, components having the same numerals as those of FIG. 2 have like names and functions. Only what differs from FIG. 2 will now be described.

With reference to FIG. 8, 1(n), 2(n), and 3(n) among n combinations of desired position data preset in the preset unit 2 correspond to horizontal angle, vertical angle and zoom, respectively. However, the system for driving the focus has been eliminated. Data of 4(n) are inputted to a computing circuit 7. If data of 4(n) are assigned to discrimination between data for daytime and data for night, the computing circuit 7 can select data out of a large amount of preset data automatically according to a timer. Thus, it is possible to monitor subjects for daytime during daytime and monitor subjects for night during night.

In the embodiment, an example of information for discrimination differing from the position information has been mentioned as the data 4(n). Alternatively, discrimination may be exercised by using information specifying position information itself such as angle ranges of the horizontal angle 1(n).

In respective embodiments, the motors 15, 25 and so on have been shown as power sources. Alternatively, actuators using oil pressure, gas pressure or the like may also be used. Furthermore, horizontal angle, vertical angle, zoom and focus have been mentioned as examples of control items. However, iris of the lens and the like may be included in the control items.

I claim:

1. An imaging apparatus with at least one movable component and a control device, said control device comprising:

control means for storing a plurality of sets of desired position data preset for control of a plurality of control items which represent a positional state of said at least one movable component, for selecting one set out of said plurality of sets of desired position data and for outputting said desired position data in said one set for at least two of said plurality of control items;

power source means, provided for respective ones of said plurality of control items, for receiving said desired position data output by said control means and for causing movement of said at least one movable component toward desired positions indicated by said desired position data output by said control means;

position sensor means, provided for said respective ones of said plurality of control items, for generating current position information of said at least one movable component corresponding to said plurality of control items;

completion detection means provided for said respective ones of said plurality of control items, for detecting completion of said movement to produce completion outputs; and an AND circuit for performing an AND function on said completion outputs, an operation completion signal being outputted from said AND circuit upon completion of said movement for all of said plurality of control items.

2. An imaging apparatus as in claim 1, wherein said at least one movable component comprises a rotary table and a lens, and wherein said plurality of control items are taken from the group consisting of a horizontal angle of the rotary table, a vertical angle of the rotary table, a zoom of the lens, a focus of the lens and an iris of the lens.

3. An imaging apparatus as in claim 1, wherein said AND circuit outputs said operation completion signal to said control means.

4. An imaging apparatus as in claim 2, wherein said control device is disposed on at least one of said rotary table and a portion of said imaging apparatus other than said rotary table.

5. An imaging apparatus as in claim 3, further comprising a pilot lamp, and wherein said control means actuates said pilot lamp in response to said operation completion signal.

6. An imaging apparatus as in claim 3, wherein said control means selects a further set out of said plurality of sets of desired position data and outputs said desired position data in said further set in response to said operation completion signal.

7. An imaging apparatus with at least one movable component and a control device, said control device comprising:

control means for storing a plurality of sets of desired position data preset for control of a plurality of control items which represent a positional state of said at least one movable component, for selecting one set out of said plurality of sets of desired position data and for outputting said desired position data in said one set for at least two of said plurality of control items;

power source means, provided for respective ones of said plurality of control items, for receiving said desired position data output by said control means and for causing movement of said at least one movable component toward desired positions indicated by said desired position data output by said control means;

position sensor means, provided for said respective ones of said plurality of control items, for generating current position information of said at least one movable component corresponding to said plurality of control items;

completion detection means provided for said respective ones of said plurality of control items, for detecting completion of said movement to produce completion outputs; and computing means for calculating a current range of visual field obtained by said imaging apparatus on the basis of said current position information during said movement, an operation completion signal being outputted from said computing means when said current visual field includes all of a desired visual field which is to be obtained when said desired positions are reached, even if said desired positions are not yet arrived at.

8. An imaging apparatus as in claim 2, wherein said at least one movable component comprises a rotary table and a lens, and wherein said plurality of control items are taken from the group consisting of a horizontal angle of the rotary table, a vertical angle of the rotary table, a zoom of the lens, a focus of the lens and an iris of the lens.

9. An imaging apparatus as in claim 8, wherein said control device is disposed on at least one of said rotary table and a portion of said imaging apparatus other than said rotary table.

10. An imaging apparatus with a rotary table, said rotary table comprising:

control means for storing a plurality of sets of desired position data preset for control of a horizontal angle and a vertical angle of said rotary table, for selecting one set out of said plurality of sets, and for outputting said desired position data in said one set;

power source means, provided for said horizontal and vertical angles, for causing movement of said rotary table toward desired positions indicated by said desired position data in said one set;

driving means, provided for said horizontal and vertical angles, for driving said power source means;

position sensor means, provided for said horizontal and vertical angles, for generating current position information indicating current values of said horizontal and vertical angles;

first computing means for calculating time values respectively required for horizontal movement and vertical movement of said rotary table on the basis of said desired position data in said one set and said current position information; and second computing means for comparing said time values, for calculating a speed correction value which is required to equalize said time values, and for controlling one of said driving means in accordance with said speed correction value, so that the horizontal angle and the vertical angle simultaneously arrive at said desired positions.

11. An imaging apparatus as in claim 10, wherein said second computing means comprises means for determining which of said time values is a shorter time value and which of said time values is a longer time value and for controlling one of said driving means corresponding to said shorter time value to increase said shorter time value to equal said longer time value.

12. An imaging apparatus with at least one movable component and a control device, said control device comprising:

control means for controlling movement of said at least one movable component to vary at least one control item which represents a positional state of said at least one movable component;

execution sequence selecting means for rearranging a sequence of a present plurality of sets of desired position data, said desired position data representing desired values of said at least one control item, to derive an execution sequence which minimizes a time required for said at least one control item to assume all of said desired values; and memory means for storing said execution sequence and controlling said control means to order execution in said execution sequence.

13. An imaging apparatus as in claim 12, wherein said at least one movable component comprises a rotary table and a lens, and wherein said at least one control item is taken from the group consisting of a horizontal angle of the rotary table, a vertical angle of the rotary table, a zoom of the lens, a focus of the lens and an iris of the lens.

14. An imaging apparatus with at least one movable component and a control device, said control device comprising:

extracting means for storing a plurality of sets of desired data preset for control of at least one control item which represents a positional state of said at least one movable component and for extracting a portion of said plurality of sets of desired data to produce extracted data; and control means for controlling said at least one movable component to move in accordance with said extracted data.

15. An imaging apparatus as in claim 14, wherein said at least one movable component comprises a rotary table and a lens, and wherein said at least one control item is taken from the group consisting of a horizontal angle of the rotary table, a vertical angle of the rotary table, a zoom of the lens, a focus of the lens and an iris of the lens.

16. An imaging apparatus as in claim 14, wherein said plurality of sets of desired data comprise desired data for different operational states, and wherein said extracting means extracts said portion in accordance with a selected one of said different operational states.

17. An imaging apparatus as in claim 13, wherein said control device is disposed on at least one of said rotary table and a portion of said imaging apparatus other than said rotary table.

18. An imaging apparatus as in claim 16, wherein said control device is disposed on at least one of said rotary table and a portion of said imaging apparatus other than said rotary table.

* * * * *